(12) United States Patent
Bonati et al.

(10) Patent No.: US 9,095,804 B2
(45) Date of Patent: Aug. 4, 2015

(54) LAMELLAR SEPARATOR WITH CATCH BASIN

(75) Inventors: Guido Bonati, Dusseldorf (DE); Gerd Stuckenschneider, Essen (DE); Jorg Stahlhut, Hunxe (DE)

(73) Assignee: Balcke-Durr GmbH, Ratingen (DE)

( * ) Notice: Subject to any disclaimer, the term of this patent is extended or adjusted under 35 U.S.C. 154(b) by 528 days.

(21) Appl. No.: 13/540,959

(22) Filed: Jul. 3, 2012

(65) Prior Publication Data

US 2014/0007774 A1    Jan. 9, 2014

(51) Int. Cl.
| | |
|---|---|
| *B01D 45/00* | (2006.01) |
| *B01D 45/04* | (2006.01) |
| *B01D 45/16* | (2006.01) |
| *B01D 46/00* | (2006.01) |
| *A47L 9/16* | (2006.01) |

(52) U.S. Cl.
CPC ............... *B01D 45/04* (2013.01); *B01D 45/16* (2013.01); *B01D 46/0031* (2013.01); *A47L 9/1608* (2013.01); *A47L 9/1683* (2013.01); *Y10S 55/03* (2013.01)

(58) Field of Classification Search
CPC .... A47L 9/1683; A47L 9/1608; B01D 45/16; B01D 46/0031; Y10S 55/03
USPC ............................ 55/440–446, 428, 432, 466
See application file for complete search history.

(56) References Cited

U.S. PATENT DOCUMENTS

| | | | |
|---|---|---|---|
| 2,921,647 A | 1/1960 | Pietrasz | |
| 3,338,035 A | 8/1967 | Dinkelacker | |
| 4,684,379 A * | 8/1987 | Gambrell | ........................ 96/262 |
| 2008/0142430 A1 | 6/2008 | Schmitz et al. | |
| 2010/0326025 A1 | 12/2010 | Bratton | |

FOREIGN PATENT DOCUMENTS

| | | |
|---|---|---|
| CN | 1997435 A | 7/2007 |
| EP | 2243533 A1 | 10/2010 |
| EP | 2272579 A1 | 1/2011 |
| GB | 1408928 A | 10/1975 |
| RU | 42182 U1 | 11/2004 |
| SU | 822849 | 4/1981 |

\* cited by examiner

*Primary Examiner* — Dung H Bui
(74) *Attorney, Agent, or Firm* — Baker & Hostetler LLP

(57) ABSTRACT

The invention relates to a lamellar separator for separating liquid droplets from a liquid-charged fluid, having at least two essentially vertically oriented lamellar profiles, which are spaced apart from one another, and which form a flow channel between them for conducting through the liquid-charged fluid and on the wall surfaces of which the liquid droplets are separated, and having a catch basin situated below the lamellar profiles for receiving the liquid separated from the liquid-charged fluid, the catch basin having at least one partition wall, which divides the catch basin into multiple areas.

6 Claims, 4 Drawing Sheets

LAMELLAR SEPARATOR WITH CATCH BASIN

FIELD OF THE INVENTION

The invention relates to a lamellar separator for separating liquid droplets from a liquid-charged fluid, having at least two essentially vertically oriented lamellar profiles, which are spaced apart from one another, and which form a flow channel for conducting through the liquid-charged fluid between them and on the wall surfaces of which the liquid droplets are separated, and having a catch basin situated at the lower end of the lamellar profiles for receiving the liquid separated from the liquid-charged fluid.

BACKGROUND OF THE INVENTION

Such lamellar separators, which are also referred to as lamellar droplet separators, are known from the prior art and are used in various processes for separating liquid droplets from a liquid-charged fluid, in particular a gas flow. In power plants, such as solar or atomic power plants, effective separation of droplets from the wet steam decides the thermal efficiency of the plant. During the intermediate superheating of the steam after the expansion in the high-pressure turbine, it is thermodynamically advantageous to dry the wet steam before the superheating in the intermediate superheater and supply it to the condensate circuit. In so-called water separator superheaters, such lamellar separators are used to withdraw moisture from the liquid-charged fluid, in particular the wet steam. A relevant lamellar separator comprises a plurality (i.e., at least two) thin-walled profiles situated parallel to one another, the so-called lamellar profiles, which define a lamellar separation space and on the wall surfaces of which the liquid droplets are separated from the fluid flowing past. For example, reference is made to GB 1 408 928 A with respect to the prior art.

SUMMARY

The invention particularly relates to a lamellar separator having vertically oriented lamellar profiles, on which the separated liquid droplets agglomerate and flow downward because of gravity and are collected in a catch basin located at the lower end of the lamellar profiles as the separated liquid. These lamellar separators known from the prior art are problematic in that the liquid located in the catch basin, in spite of a drain, is swirled and entrained by the fluid stream flowing through the lamellar separator or is spun upward into the lamellar separation space because of the swirling and entrained and discharged therefrom. The immersion of the fluid flow into the catch basin and the accompanying upwardly-oriented lateral flows of the fluid stream from the catch basin into the lamellar space opposite to the drainage direction of the separated liquid droplets are also problematic, so that these droplets cannot drain downward unobstructed, but rather are detached from the lamellar surface and expelled.

The invention is therefore based on the object of specifying a lamellar separator of the abovementioned type, in which the separated liquid located in catch basin is calmed and is not swirled or at least is swirled less strongly, so that the liquid is not detached from the lamellae again.

This object is achieved in that the catch basin has at least one partition wall, which divides the catch basin into multiple areas.

A lamellar separator for separating liquid droplets from a liquid-charged fluid is proposed, having at least two essentially vertically oriented lamellar profiles, which are spaced apart from one another, and which form a flow channel (lamellar passage) between them for conducting through the liquid-charged fluid and on the wall surfaces of which the liquid droplets are separated, and having a catch basin situated at the lower end of the lamellar separation space for receiving the liquid separated from the liquid-charged fluid. It is provided that the catch basin has at least one partition wall, which divides the catch basin into multiple (i.e., at least two) areas.

The geometric division of the catch basin into multiple areas or chambers using one or more partition walls prevents the water separated into the catch basin from being agitated and droplets from the agitated water surface from being entrained by the fluid stream flowing past and being carried back upward into the lamellar separation space, which would reduce the efficiency of the lamellar separator. The surface of the separated and collected liquid in the catch basin can thus also be calmed and/or kept calm even in the event of high flow speeds of the fluid flowing through the lamellar separator, whereby harmful swirls of the water level and upwardly-directed lateral flows in the lamellar space can be reduced. Because the partition wall or partition walls are in the flow pathway of the liquid-charged fluid, it or they is/are used as an obstruction, at which the fluid stream is blocked or deflected, whereby immersion of the fluid stream and the upwardly-directed lateral flow between the lamellar separation space and the liquid level connected thereto is prevented. Furthermore, the drainage of the collected liquid is improved, whereby the level in the catch basin can advantageously be kept low in operation. The through-flow speed can therefore advantageously be increased.

In an advantageous refinement of the invention, at least one partition wall is oriented essentially vertically and extends from the basin floor up to at least the lower edges of the lamellar profiles. I.e., the partition wall extends from the basin flow of the catch basin at least up to directly at the lamellar separation space. However, it can also extend beyond the lower edge up into the lower area of the lamellar profiles. In this way, the separated and collected liquid in the catch basin can be calmed and/or kept calm particularly well. The immersion of the fluid stream in the catch basin and upwardly-directed lateral flows in the lamellar space resulting therefrom are reduced in this way.

It has proven to be particularly advantageous for at least one partition wall to run transversely to the flow direction of the liquid-charged fluid flowing through the lamellar separator. The partition wall plane of such a partition wall is expediently oriented essentially perpendicularly to a lamellar profile.

A preferred refinement is that at least one separate drain is provided for each area of the catch basin formed by the partition wall. According to an alternative preferred refinement, it is provided that a common drain is provided for two adjacent areas of the catch basin which are separated by the partition wall. Furthermore, it is advantageous for the partition wall to have at least one passage in the area of the basin floor, which connects two adjacent areas which are separated by the partition wall. In this way, different levels in the areas connected to one another may be equalized. Furthermore, this makes it possible that only one of the areas connected via the passage is provided with a drain, as explained in greater detail hereafter in connection with the figures.

According to another preferred refinement, it is provided that the lamellar profiles are formed to be at least approximately corrugated and are oriented at least approximately parallel to one another, multiple baffles (pointing opposite to the flow direction) protruding into the flow channel from at least one of these lamellar profiles, which form catch pockets pointing opposite to the flow direction for the liquid droplets to be separated. In particular, it is provided that multiple undercut plates (pointing in the flow direction) protrude from the same lamellar profile, which form undercuts pointing in the flow direction, the undercut plates pointing in the flow direction being overlapped by a defined value on their outer side facing away from the lamellar profile by the baffles pointing opposite to the flow direction, whereby a labyrinth separator system for the liquid droplets to be separated is formed. Such a lamellar profile is explained in greater detail hereafter in connection with the figures. It has been shown that a lamellar separator having lamellar profiles formed in this way has a particularly high degree of separation, which results in a high catch volume stream with respect to the separated liquid, for which a catch basin according to the preceding statement is outstandingly suitable.

BRIEF DESCRIPTION OF THE DRAWINGS

The invention is described further hereafter for exemplary purposes on the basis of three preferred exemplary embodiments illustrated in the figures, identical and/or functionally-identical components being identified by the same reference numerals. In the schematic figures.

DETAILED DESCRIPTION

Figure 1:
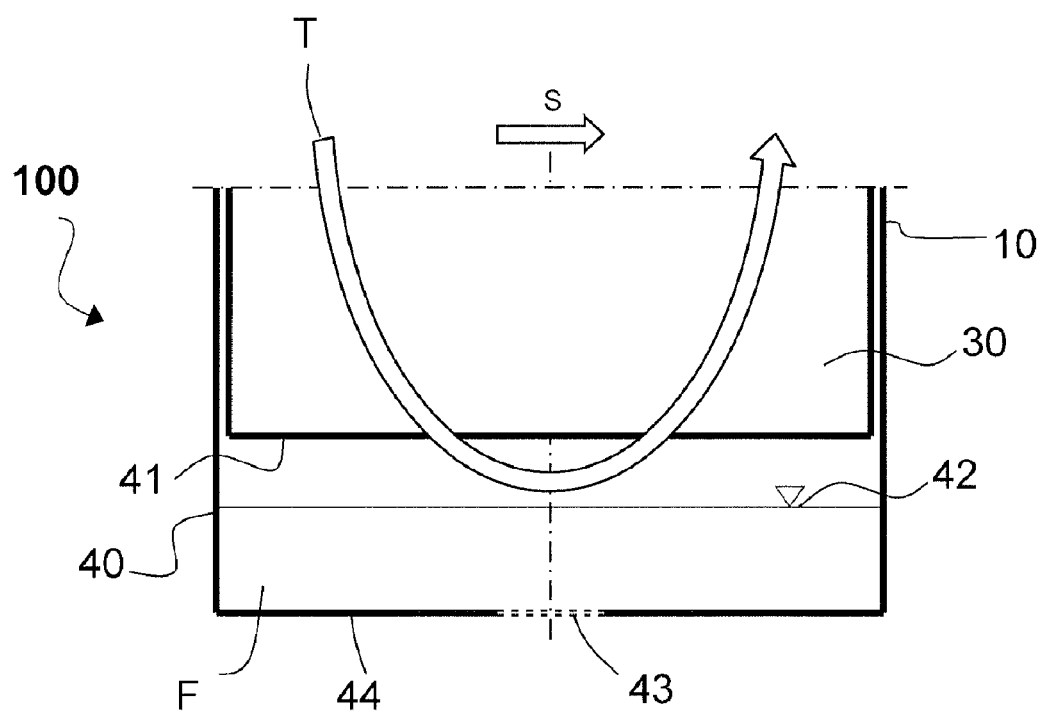
FIG. 1 illustrates a lamellar separator according to the prior art in a partial sectional view.

FIG. 1 illustrates a lower base area of a lamellar separator 100 according to the prior art. The lamellar separator 100 is enclosed by a housing 10, in which a catch basin 40 is integrated. The lamellar separator 100 has vertically oriented lamellar profiles situated in parallel and spaced apart from one another, which together form the lamellar separation space, of which only a lower part of a single lamellar profile 30 is visible in FIG. 1. A lower edge of the lamellar profile 30 is identified by 31. A liquid-charged fluid flows through the lamellar separator 100 in the specified through-flow direction S, liquid droplets being separated from the fluid flowing past on the wall surfaces of the lamellar profiles 30 in a known way. The separated liquid droplets agglomerate and drain downward because of gravity into the catch basin 40 provided for this purpose. The collected liquid F can drain through a drain opening 43 (illustrated by dashed lines) located in the basin floor 44.

In the lamellar separator 100 illustrated in FIG. 1, a partial stream of the liquid-charged fluid can reach the surface 41 of the collected liquid F between the lower edges 31 of the lamellar profiles 30 and/or plunge into the catch basin 40. The flow direction of this partial stream is identified by T. If the partial stream from the catch basin 40 is deflected in the upward direction between the lamellar profiles 30, it moves opposite to the separated liquid droplets, which would drain downward into the catch basin 40 because of the force of gravity. The liquid droplets are detached from the lamellar surface by the partial stream having the flow direction T and discharged upward and not collected in the catch basin 40, as intended.

Figure 2:
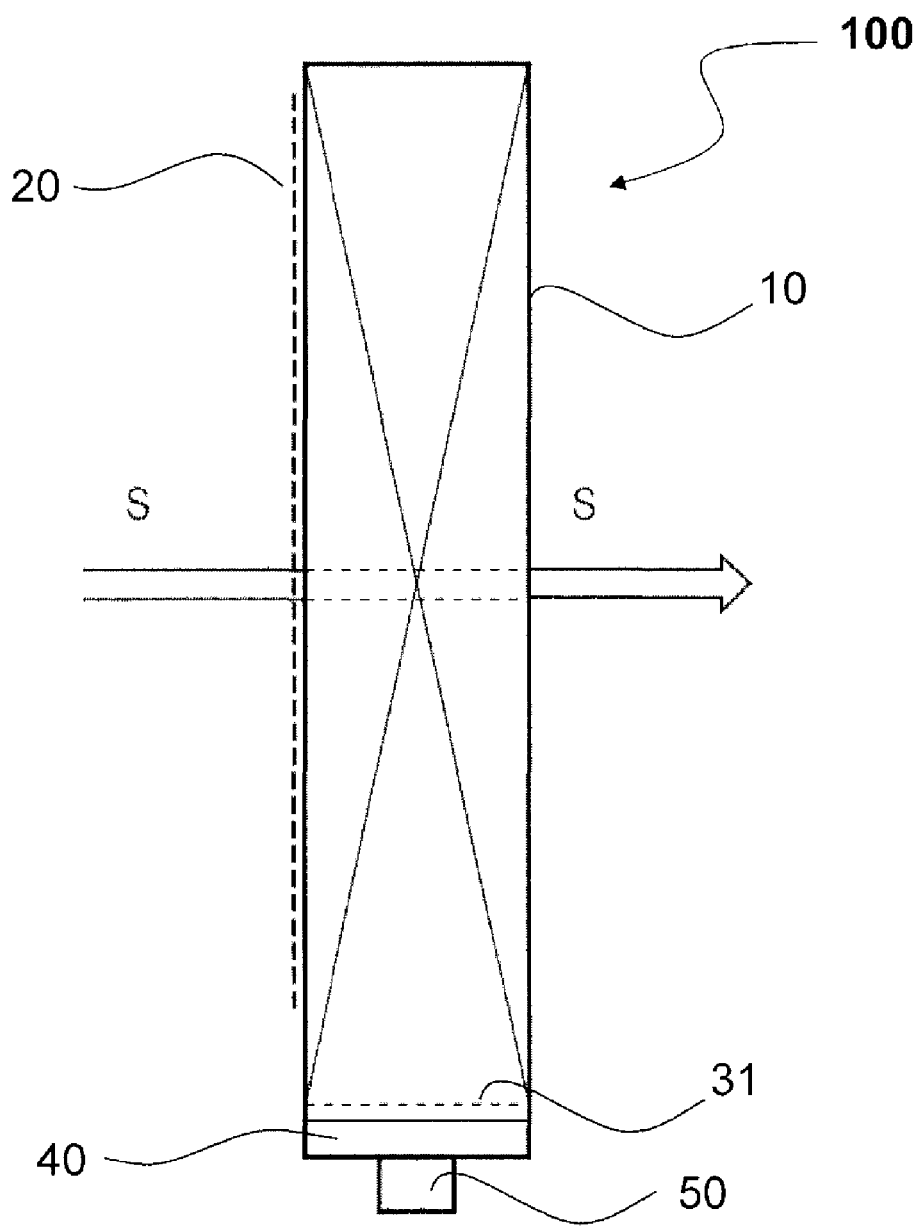
FIG. 2 illustrates a lamellar separator in a side view.

FIG. 2 illustrates a side view of a lamellar separator according to the invention, identified as a whole by 100. The lamellar separator 100 has a housing 10, which encloses a lamellar separation space having multiple essentially vertically oriented lamellar profiles 30 (not illustrated), which are spaced apart from one another. A liquid-charged fluid, in particular a gas or steam stream, flows through the lamellar separator 100 in the specified through-flow direction S (so-called horizontal inflow and through flow), the liquid droplets contained in the liquid-charged fluid being separated in a known way on the wall surfaces of the lamellar profiles 30. The agglomerated, separated liquid droplets drain because of gravity into the catch basin 40 provided for this purpose, which can be formed as a catch shell. The catch basin 40 can be integrated in the housing 10 or formed as a separate component. The lower edges 31 (not visible) of the lamellar profiles 30 are indicated as a dashed line. An entry area for the liquid-charged fluid into the housing 10 is identified by 20, which is typically implemented by a perforated plate. A drain nozzle of the catch basin 40 is identified by 50.

Figure 3:
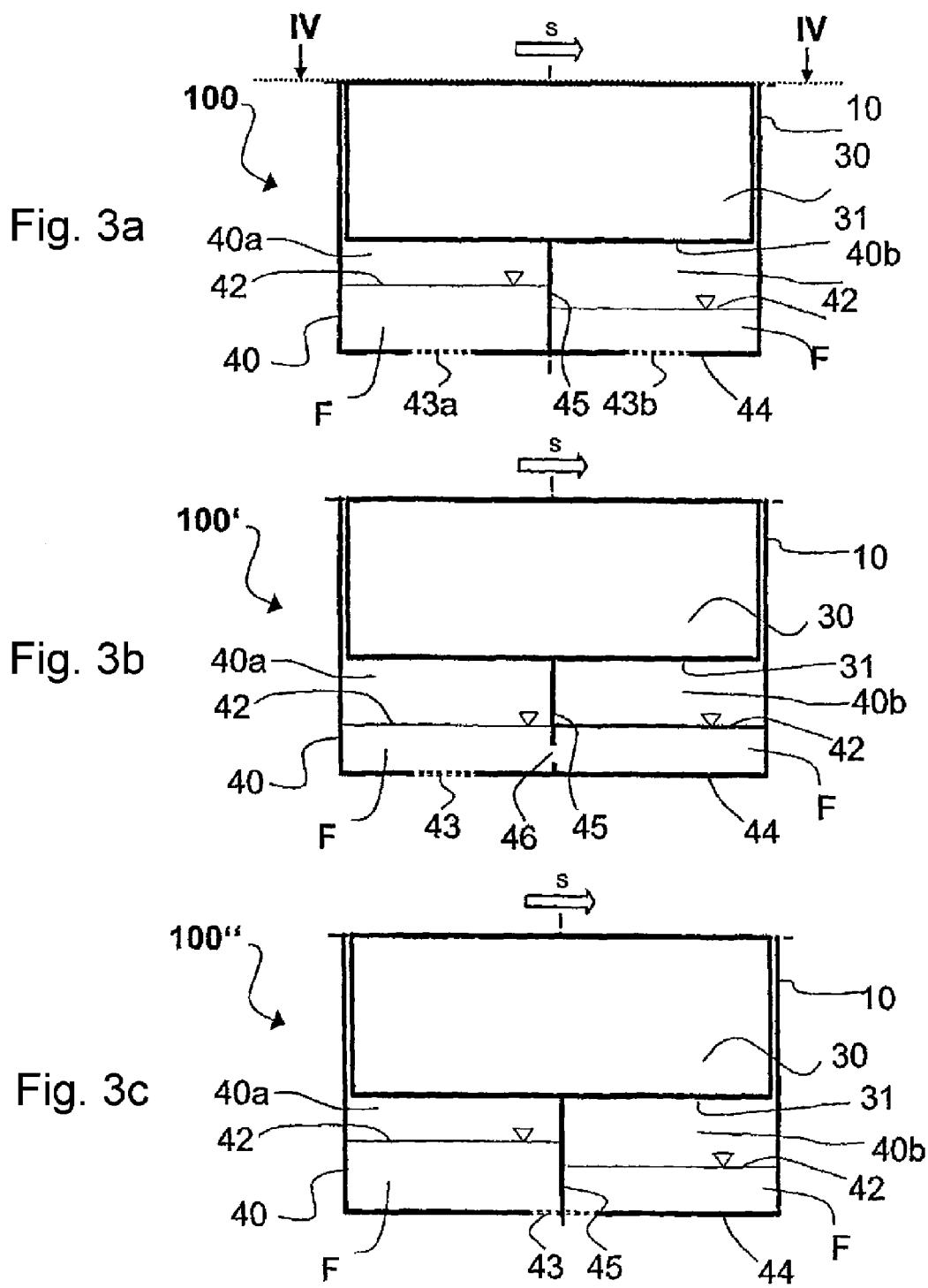
FIGS. 3a-3c illustrate three exemplary embodiments of a lamellar separator according to the invention in partial sectional views.

FIG. 3a illustrates a first exemplary embodiment of a lamellar separator 100 having a catch basin 40. The description hereafter applies similarly for the second and third exemplary embodiments of a lamellar separator 100' and 100", respectively, which are illustrated in FIG. 3b and FIG. 3c. The catch basin 40 is integrated in the housing 10 of the lamellar separator 100, 100', 100" and extends over the entire width and preferably also the depth of the housing 10. A partition wall 45 is situated approximately in the middle of the width in the inner chamber of the catch basin 40, the partition wall extending from the basin floor 44 up to the lower edge 31 of the lamellar profile 30 and over the entire depth of the catch basin 40. The partition wall 45 in this exemplary embodiment divides the catch basin 40 into two areas or chambers 40a and 40b. Through this division, the surface 42 of the separated and collected liquid F in the catch basin 40 can also be calmed and/or kept calm at high flow speeds of the fluid flowing through the lamellar separator 100, 100', 100", whereby harmful eddies are reduced. Because of possible high flow speeds of the fluid, the partition wall comprises a corrosion-resistant material, preferably metal.

Through the division of the catch basin 40 into two areas 40a and 40b, the drainage of the collected liquid F is further improved (interference-free discharge), whereby the level can advantageously be kept low in operation. In the first exemplary embodiment of FIG. 3a, the two areas 40a and 40b each have a drain opening 43a and 43b in the basin floor 44. In the second exemplary embodiment of FIG. 3b, either only the left area 40a or possibly the right area 40b is provided with a drain opening 43. Furthermore, the partition wall 45 has a passage 46 in the area of the basin floor 44, which connects the separated areas 40a and 40b to one another below the surface 42 of the collected liquid F. In the third exemplary embodiment of FIG. 3c, a common drain opening 43 is provided in the basin floor 44 for the two areas 40a and 40b separated by the partition wall 45, which extends halfway over the partition wall 45 in each case. If, as in the first exemplary embodiment of FIG. 3a, separate drain openings are provided for the individual areas 40a and 40b of the catch basin 40, they may be dimensioned smaller than if only one common drain opening is provided, as in the second and third exemplary embodiments according to FIGS. 3b and 3c. The number of drain openings to be provided can therefore also be oriented to the structural boundary conditions.

Figure 4:
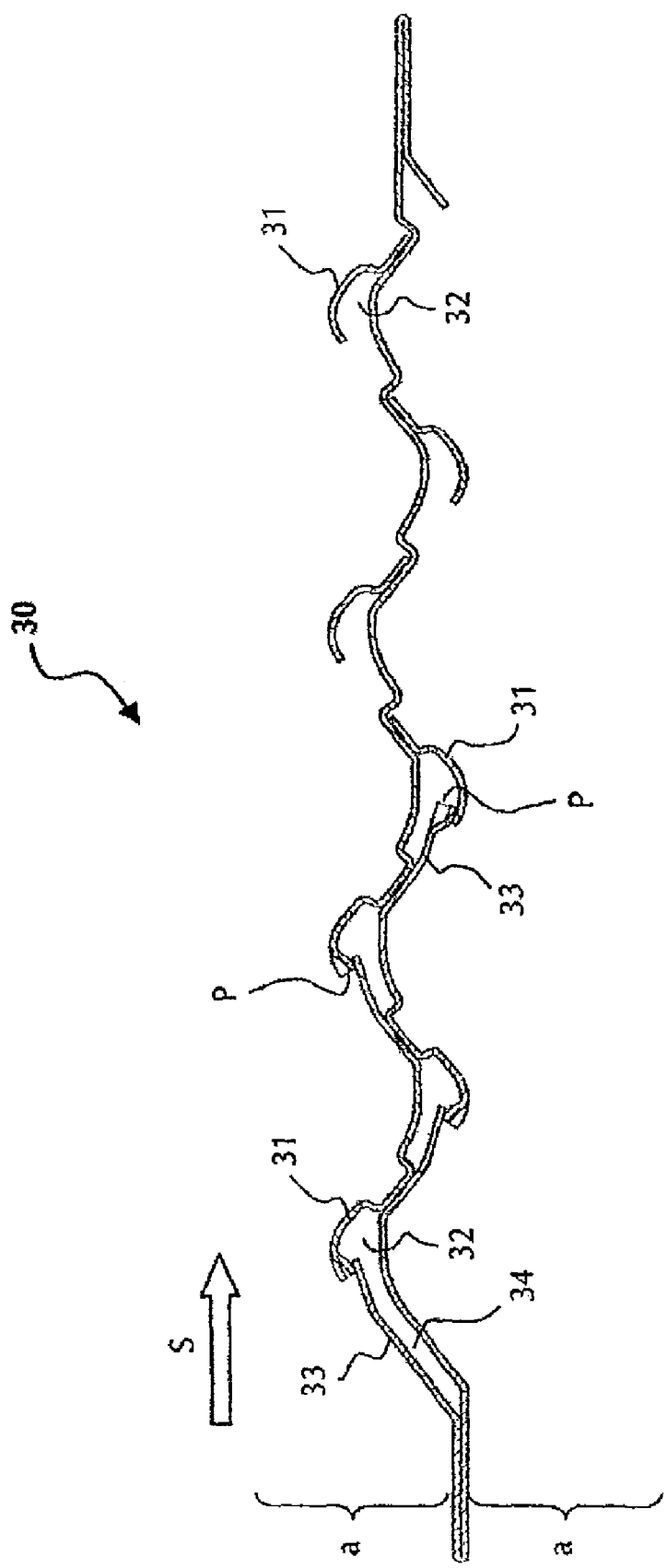
FIG. 4 illustrates a lamellar profile of a lamellar separator of FIGS. 3a-3c in a top view.

A particularly preferred lamellar profile is described hereafter in connection with FIG. 4, which is used in a lamellar separator 100, 100', 100" according to the invention and has a particularly high degree of separation with low pressure loss. A single lamellar profile 30 is illustrated in a top view along line IV-VI indicated in FIG. 3a. Lamellar profiles (not illustrated), which are preferably formed identically, are situated at the distance a in parallel to this lamellar profile 30, two adjacent lamellar profiles 30 forming a flow channel between them to conduct through the liquid-charged fluid in a predefined flow direction S.

The lamellar profile 30 has an approximately corrugated shape in the flow direction S. Multiple baffles 31 protrude opposite to the flow direction S on both sides of the lamellar profile 30, which form catch pockets 32, which point opposite to the flow direction S, for liquid droplets. Furthermore, multiple undercut plates 33 pointing in the flow direction protrude on both sides from the lamellar profile 30, which form undercuts 34 pointing in the flow direction S. The undercut plates 33 pointing in the flow direction S are overlapped by a defined value on their outer sides facing away from the lamellar profile by the baffles 31 pointing opposite to the flow direction S, whereby an effective labyrinth separator system for liquid droplets and a common collection chamber (catch pocket 32 plus undercut 34) for receiving the separated liquid is formed. The undercut plates 33 are only implemented in the first half of the lamellar profile 30 with respect to the flow direction S, to achieve a particularly high degree of separation in this section in particular. Furthermore, the undercut plates 33 are formed having decreasing length in the flow direction S, whereby the undercuts and the common collection chamber have a decreasing volume in the flow direction S.

The end edges of the baffles 31 and/or the undercut plates 33 are provided with an embossed structure P in the overlap area between the undercut plates 33 and the external baffles 31, whereby defined contact points are formed in the overlap area. As illustrated, the lamellar separator 30 is formed from a plurality of metal molded parts which are welded to one another.

We claim:

1. A lamellar separator for separating liquid droplets from a liquid-charged fluid, having
   at least two vertically oriented lamellar profiles, which are spaced apart from one another, and which form a flow channel for conducting through the liquid-charged fluid between them and on wall surfaces of the lamellar profiles of which the liquid droplets are separated, and
   a catch basin situated below the lamellar profiles for receiving the liquid separated from the liquid-charged fluid, wherein
   the catch basin has at least one partition wall, which divides the catch basin into multiple areas,
   in the area of a basin floor, the partition wall has at least one passage, which connects two adjacent areas, separated by the partition wall, to one another, and
   only one of the two adjacent areas connected to one another via the passage is provided with a drain.

2. The lamellar separator according to claim 1, wherein the partition wall is oriented vertically and extends from the basin floor up to at least the lower edges of the lamellar profiles.

3. The lamellar separator according to claim 1, wherein the partition wall runs in a flow pathway of the liquid-charged fluid, so that it forms an obstruction for flow of the liquid-charged fluid.

4. The lamellar separator according to claim 3, wherein the partition wall runs transversely to a flow direction of the liquid-charged fluid.

5. The lamellar separator according to claim 1, wherein the lamellar profiles are formed to be corrugated and are oriented parallel to one another, multiple baffles protruding into the flow channel from at least one of these lamellar profiles, which form catch pockets, pointing opposite to a flow direction, for the liquid droplets to be separated.

6. The lamellar separator according to claim 5, wherein multiple undercut plates protrude from the same lamellar profile, which form undercuts pointing in the flow direction, the undercut plates pointing in the flow direction being overlapped by a defined value on their outer sides facing away from the lamellar profile by the baffles pointing opposite to the flow direction, whereby a labyrinth separator system is formed for the liquid droplets to be separated.

* * * * *